United States Patent [19]

McKenna et al.

[11] Patent Number: 4,748,028

[45] Date of Patent: May 31, 1988

[54] ASEPTIC FLUID COFFEE WHITENER AND PROCESS FOR PREPARING SAME

[75] Inventors: Ronald J. McKenna, Marcellus; David J. Keller, Syracuse; Paul J. Streiff, Camillus, all of N.Y.

[73] Assignee: Borden, Inc., Columbus, Ohio

[21] Appl. No.: 16,131

[22] Filed: Feb. 18, 1987

[51] Int. Cl.$^4$ .......................... A23C 11/02; A23L 1/19
[52] U.S. Cl. .................................... 426/130; 426/392; 426/602
[58] Field of Search ................................ 426/602, 399

[56] References Cited

U.S. PATENT DOCUMENTS

| | | |
|---|---|---|
| 3,230,095 | 1/1966 | Stewart, Jr. . |
| 3,563,761 | 2/1971 | Ellinger .......................... 426/603 X |
| 3,695,889 | 10/1972 | Ingerson .......................... 426/602 X |
| 3,917,859 | 11/1975 | Terada et al. . |
| 4,092,438 | 5/1978 | Tonner . |
| 4,146,652 | 3/1979 | Kahn et al. . |
| 4,161,090 | 7/1979 | Wakeman . |
| 4,175,141 | 11/1979 | Adams, Jr. . |
| 4,199,604 | 4/1980 | Kahn et al. . |
| 4,199,605 | 4/1980 | Kahn et al. . |
| 4,239,786 | 12/1980 | Gilmore et al. ................ 426/602 X |
| 4,310,561 | 1/1982 | Buddemeyer et al. . |
| 4,341,811 | 7/1982 | Buddemeyer et al. . |
| 4,360,535 | 11/1982 | Darling et al. ................ 426/602 X |
| 4,407,838 | 10/1983 | Rule et al. ........................... 426/602 |
| 4,434,186 | 2/1984 | Desia et al. . |
| 4,461,777 | 7/1984 | Murase et al. . |

FOREIGN PATENT DOCUMENTS

| | | |
|---|---|---|
| 2247081 | 4/1973 | Fed. Rep. of Germany . |
| 60-153756 | 8/1985 | Japan . |
| 561532 | 5/1944 | United Kingdom . |
| 646484 | 11/1950 | United Kingdom . |

OTHER PUBLICATIONS

Kirk–Othmer, *Concise Encyclopedia of Chemical Technology*, p. 573 (1985).
Webb et al., *Fundamentals of Dairy Chemistry*, Second Edition, pp. 102–103, 310–312, and 632.
Informational Brochure, "Grindsted Emulsifiers" (undated).
New Zealand Milk Products, Inc., "Alanate 180" Product Bulletin (Undated).
FMC Technical Data, "Dipotassium Phosphate" (11/82).

*Primary Examiner*—Raymond N. Jones
*Assistant Examiner*—Celine Callahan
*Attorney, Agent, or Firm*—Frank E. Robbins; James R. Laramie; George P. Maskas

[57] ABSTRACT

An aseptically packaged, liquid, non-dairy coffee whitener which is shelf-stable for several months, and a process for preparing it, are provided. The coffee whitener comprises water, vegetable fat, an edible emulsifier system, a milk protein, salt, and other optional ingredients. The process comprises performing an ultra-high temperature sterilization treatment on a mixture comprising water, heated vegetable fat, an edible emulsifier system, and milk protein; cooling; homogenizing; and further cooling and packaging the resulting emulsion in an aseptic container under aseptic conditions. The product is shelf-stable for several months before opening and is stable against browning under refrigeration conditions for up to four weeks after opening. Browning is avoided by the absence or substantial absence of any reducing sugar in the product.

27 Claims, No Drawings

ASEPTIC FLUID COFFEE WHITENER AND PROCESS FOR PREPARING SAME

BACKGROUND OF THE INVENTION

1. Field of the Invention

The present invention relates to an aseptically packaged, liquid, shelf-stable non-dairy coffee whitener, that is substantially free of reducing sugar, and to a process for preparing the same. The product is shelf-stable at room temperature for up to several months.

2. Background

For many years there has been an interest in the production of shelf-stable dairy products. Fluid dairy products can be preserved for short periods of time by refrigeration, but nonetheless deteriorate fairly rapidly due to microbiological activity. Pasteurization slows down such deterioration somewhat but does not prevent it.

While refrigerated dairy products have the advantage of fresh taste, several disadvantages exist. In addition to the inconvenience to the consumer of having to obtain fresh dairy products on a frequent basis, fresh dairy products incur costs to the distributor which translate into an increased price for the consumer; for example, the products must be distributed and marketed under cooled conditions, and dairy products which have sat on the shelf for more than a few days become unfit for consumption and must be returned to the distributor. Of particular interest, therefore, has been a cream product having a long shelf life, inasmuch as cream is a "Sunday product" which is typically used only on an infrequent basis.

In recent years, several systems have been developed to provide commercially feasible packaging of dairy-type products intended for long term storage without refrigeration. One such development concerns the use of powdered non-dairy coffee whiteners or "creamers". These powdered coffee whiteners are typically comprised of vegetable or animal fat, carbohydrate, protein, emulsifiers, and stabilizing and buffering salts. Typically, such powdered whiteners comprise 15% to 55% by weight of fat, 42.9% to 80.6% by weight of carbohydrate, 1.5% to 5.5% by weight protein, 0.5% to 1.0% by weight of an emulsifier, 0% to 1.3% by weight of a stabilizer, 0.8% to 2.5% by weight of a stabilizing salt, and 0% to 3.0% of color-flavor. While these powdered coffee whiteners have the distinct advantage of having an almost indefinite shelf-life, they also have distinct disadvantages, one of which is that they do not cool coffee or other hot beverages to which they are added to any significant degree. Also, because they are in powdered rather than liquid form, they do not adequately simulate real dairy cream.

To correct for these disadvantages, fluid non-dairy creamers have been developed. These creamers typically have the same ingredients as the powdered whiteners discussed above, except that they are in a liquid emulsion which more closely simulates a liquid cream product. However, such liquid creamers have a markedly reduced shelf-life as compared to the powdered creamers; namely, off-flavors and off-colors are noticed as soon as nine days after packaging, probably attributable to the browning reaction.

A further significant development in the provision of shelf-stable dairy products comprises aseptic packaging systems which have been developed to provide commercially feasible packaging of dairy products intended for a long term storage without refrigeration. These systems make use of ultra-high temperature (UHT) treatment to sterilize the liquid dairy product, i.e., milk, prior to packaging it. UHT treatment produces a product that is free of spoilage organisms by heating the fluid dairy product to a temperature that is high enough to kill spore-forming organisms, but for a sufficiently short period of time so as to minimize the physical and chemical changes in the product itself. Common process parameters for UHT treatment are a temperature in the range of 140° C. to 150° C. for a time of from 2 seconds to 7 seconds. By utilizing the UHT treatment in conjunction with an aseptic filling system, fluid products can be produced that remain fresh at ambient temperature for extended periods. The techniques and equipment that are required for UHT processing and for aseptic filling are well known in the art. Although such ultra-high temperature treated products tend to have a long shelf-life, undesirable changes in the taste and/or color of the product may be noted as a result of reactions that occur between the constituents of the dairy products at the high temperatures at which the UHT treatment is performed.

There appears to us to be a need for a packaged, shelf-stable, liquid non-dairy coffee whitener which is shelf-stable for long periods of time at room temperature and which is free of undesirable off-flavors and/or off-colors even after storage at room temperature for many weeks or months.

SUMMARY OF THE INVENTION

The coffee whitener of the present invention consists of fat, milk protein, water, and an emulsifier system. It is in the form of an oil-in-water emulsion, aseptically packaged, and shelf-stable for a substantial period of time. Its flavor, texture, mouth-feel, color, and aroma are usually very good after being stored at moderate temperature, i.e., 27° C. or less, for a substantial period of time, such as shelf storage time of six to twelve weeks, or even longer.

It is an aseptically packaged, liquid, non-dairy coffee whitener which is shelf-stable at room temperature for up to several months. It comprises about 75% to about 91% by weight of water; about 5% to about 15% by weight of vegetable fat; about 0.07% to about 0.30% by weight of an emulsifier system; and about 0% to about 2.6% by weight of a milk protein which is a casein derivative in the form of sodium, calcium, potassium, or magnesium caseinates or combinations of these products which are substantially free of reducing sugar. The milk protein may be derived from acid casein that has been converted to the soluble form by reaction with alkali or phosphate compounds. Optionally, a vegetable gum stabilizer, flavoring material, and/or a phosphate salt may be included in the composition.

The invention also resides in a process for preparing this coffee whitener product. This process comprising the steps of: (a) performing an ultra-high temperature sterilization treatment on a mixture comprising water, vegetable fat, an emulsifier system, and milk protein; (b) cooling the mixture; (c) homogenizing the mixture; and (d) further cooling and packaging the resulting emulsion in an aseptic container under aseptic conditions.

In a preferred embodiment, the ultra-high temperature treatment is an indirect heating process, which is followed by cooling and homogenizing at a pressure of about 1500 psi to about 4000 psi.

In another embodiment, the aseptically packaged liquid non-dairy coffee whitener is maintained at a cooled temperature of about 0° C. to about 10° C. for a period of about two months before being subsequently stored at up to about 27° C. when shelved and offered for sale.

The product is substantially free of reducing sugar. This is believed to enhance its stability during processing and after packaging, probably by making the Maillard reaction with the protein component, and similar reactions, impossible.

DETAILED DESCRIPTION OF THE INVENTION

In its broadest embodiment, the invention relates to an aseptically packaged, liquid non-dairy coffee whitener which is shelf-stable at room temperature for several months comprising about 75% to about 91% by weight of water; about 5% to about 15% by weight of vegetable fat; about 0.07% to about 0.30% by weight of an edible emulsifier; and about 0% to about 2.6% by weight of a milk protein.

The vegetable fat constituent of the coffee whitener comprises partially or wholly hydrogenated vegetable oils, alone or in combination. Examples of suitable vegetable oils include coconut oil, soybean oil, cottonseed oil, palm oil, palm kernel oil, peanut oil, or blends of any of the above. Blends of partially or wholly hydrogenated vegetable oils are widely available commercially, and may be used in the present invention. Such oils generally have a melting point within the range of about 76° F. to 110° F.; perferably a vegetable oil constituent having a melting point of approximately 105° F. (approximately 40.6° C.) is employed herein.

One preferred vegetable oils comprises a blend of partially hydrogenated vegetable oils selected from coconut, palm kernel and palm oils, and has a Wiley melting point of 101°-107° F. and a maximum free fatty acid content (as oleic acid) of 0.05%.

Besides having an effect on the melting point of the vegetable oil constituent, hydrogenation of the oils which are used affects the consistency of the non-dairy coffee whitener as well as stabilizing against oxidation of the fats, thus increasing the shelf-life of the product.

Another essential ingredient of the composition is an edible emulsifier system. This is essential because of the high ratio of water to fat in the product. Emulsification is especially important inasmuch as the fat content is high and the protein content is very low, which would allow for significant fat separation. Preferred emulsifiers are commercially available distilled monoglycerides and esters of monoglycerides.

One preferred emulsifier is Dimodan PV-K, a saturated type distilled monoglyceride emulsifier having a melting point of 72° C., maximum free fatty acid content of 1.5%, and maximum free glycerol content of 1%, available from Grinsted Products, inc., Industrial Airport, Kans. Another preferred emulsifier is Panodan FDP-K which comprises diacetyl tartaric acid esters of monoglycerides having a melting point of about 45° C., acid value of 62-76%, and saponification value of 395-420, which is also available from Grinsted Products.

Another suitable emulsifier is Myvatex Texture Lite, available from Eastman Kodak, Rochester, N.Y. This product is an aerating cake emulsifier prepared from distilled propylene glycol monoesters blended with distilled monoglycerides, and sodium stearoyl lactylate.

Other suitable emulsifiers include lecithin, sodium stearoly-2-lactylate, polysorbate 80, and commercially available mono- and diglycerides such as Kodak's Myvatex 8-20E. Preferably, the emulsifier is a combination of compounds of the type Dimodan PV-K saturated distilled monoglycerides and Panodan FDP-K diacetyl tartaric acid esters of monoglycerides, preferably in a ratio of about 0.5:1 to 3:1 of the distilled monoglycerides to monoglyceride esters, and most preferably in a ratio of about 1.9:1 to 3:1.

The emulsifier system comprises about 0.07% to 0.30% by weight of the composition, preferably about 0.1% to 0.3% by weight, and most preferably about 0.2% to 0.3% by weight. If less than about 0.07% by weight of the emulsifier is used, fat separation may readily occur upon standing. If more than about 1% by weight of the emulsifier system is used, reverse emulsion may occur, resulting in the formation of off-flavors.

Another optional ingredient is the milk protein casein, which may be regarded as a caseinate in its fully converted form. The caseinate material may be calcium caseinate, sodium caseinate, potassium caseinate, magnesium caseinate, or a mixture of these. Alternatively, the milk protein may be supplied as acid casein which can be converted to a soluble caseinate by reaction with an alkali or phosphate compound. Sodium caseinate is the preferred soluble caseinate.

A preferred milk protein material is Alanate 180 fresh curd sodium caseinate, available from New Zealand Milk Products, Inc., Petaluma, Calif. This product is a spray-dried, totally reacted milk protein having a protein content of 94.5% (dry basis), moisture content of 4.0%, and fat content of 1.1%.

The caseinate material comprises about 0% to 2.6% by weight of the composition, preferably about 0.75% to 0.95% by weight and most preferably about 0.8% to 0.9% by weight. This protein constituent is essential in providing body, whitening, and desired mouth-feel to the composition. If less than about 0.2% by weight of the caseinate is employed, these properties may be below standard. If more than about 5% by weight of the caseinate is used, the result may be protein separation and consequent off-flavor formation.

Another ingredient of the present invention, preferably used, is a stabilizer constituent. The stabilizer is desirable for providing proper mouth-feel and viscosity to the composition. Suitable stabilizers include carrageenan and other vegetable gums, alone or in combination. The stabilizer which is used in the present invention is distinguished from edible, digestable carbohydrates that are reducing in nature, which may not be used. These stabilizer components are carbohydrates that are free of or substantially free of aldehyde (reducing) groups, as compared to nutritive components such as dextrose and sweet corn syrups.

Preferred stabilizers include carrageenan products commercially available as #205 Viscarin GP 109 which is a trademark of FMC Corporation, Philadelphia, Pa., or CMJ-2, available from Hercules Incorporated, Wilmington, Del. The stabilizer comprises about 0.02% by weight to 0.11% of the composition, preferably about 0.08% to 0.12% by weight of the composition, most preferably about 0.08% to 0.1% by weight of the composition.

Other ingredients which are preferably used are phosphate salts, i.e., dipotassium phosphate and sodium tripolyphosphate salt. The dipotassium phosphate salt is useful in regulating the acidity of the product when in an acidic coffee medium (i.e., by acting as a buffer), preventing curdling and/or "feathering". Dipotassium phosphate may be added either in dry form or in a solution (e.g., a 50% aqueous solution). One suitable source is FMC Corporation, from which it is available as a 50% aqueous solution.

Sodium tripolyphosphate acts as an "emulsifying salt" which "conditions" protein to keep it suspended in the liquid medium.

Dipotassium phosphate salt may comprise about 0.3% to 0.7% by weight of the composition, and preferably about 0.35% to 0.60% by weight. Sodium tripolyphosphate salt may comprise about 0.06% to 0.1% by weight and preferably about 0.07% to 0.09% by weight.

Additionally, artificial flavors may be used to impart real cream flavor to the present product. In the absence of such an added flavor, the product is basically bland and tasteless. Suitable flavors include fatty acids, ketones, lactones, alcohols, esters, essential oils, and other natural and artificial flavors, ordinarily dissolved in suitable solvent such as propylene glycol.

Optionally, an artificial color such as Vegetone coloring agent may be obtained from Kalsec Inc. of Kalamazoo, Mich. and may be used.

Furthermore, optional ingredients, such as preservatives, nutritional additives and artificial sweeteners may be added. Such additives include potassium sorbate, sodium benzoate, lecithin, polysorbate 80, sodium citrate, vitamins A and D, beta-carotene, riboflavin, and aspartame or saccharin.

An essential feature of this invention is that it is substantially free of reducing sugars. At the temperatures required for providing an aseptic product, specifically UHT temperatures of about 137° C. to above 149° C., a reaction occurs between protein in the mixture and any reducing sugar present. This reaction, known as the Maillard reaction, results in browning of the composition in a short time. It has been found that, if a reducing sugar having a dextrose equivalent (DE) of less than about 10 is used, this reaction, and subsequent browning, is delayed; if no reducing sugar is employed (i.e., the theoretical dextrose equivalent is zero) the reaction is prevented entirely.

If the protein component (i.e., the caseinate), the second ingredient of the Maillard reaction, is omitted, the composition lacks body, whiteness and a desirable mouth-feel. The third condition of the maillard reaction is a high temperature; however, if a high temperature is not used in the present process, the shelf stability is decreased dramatically. The inventors have therefore concluded that the most desirable way to eliminate browning by the Maillard reaction is to eliminate the reducing sugar component.

One interest in eliminating or minimizing the browning reaction arises from its relation to nutrition. The economic interest in browning and production of color and concomitant off-flavor is obvious. Browning results in lowered consumption of the food involved because of poor palatability, poor appearance, and less desirable physical properties, loss of nutritional value from destruction of essential amino acids and vitamins, and loss of biological value and digestibility of protein. Finally, browning may produce toxic substances and metabolic inhibitors.

The most important heat-induced changes in dairy products are the changes associated with browning. The browning reaction in milk or cream involves, it is believed, the free amino groups of milk proteins and the aldehyde group of lactose or other reducing sugars present. This reaction requires a relatively low energy of activation and is believed to be autocatalytic. It is reported to produce, among many other things, maltol, 5-hydroxy-methyl-2-furfuraldehyde, and furfuryl alcohol.

Browning is generally sought to be avoided in the dairy industry because of its detrimental effect on the nutritive value of milk products, through interaction of the protein and reducing carbohydrate, and the resulting rearrangement products. In practice, browning is sought to be avoided by limiting thermal hazard, i.e., exposure to elevated temperature. Since aseptic packaging is an integral part of the present invention, exposure of the product to high temperatures cannot be avoided. Therefore the use of reducing carbohydrate is avoided.

In general, a whitener composition in accordance with the present invention will have commercially acceptable stability if the DE of the entire whitener composition is less than one.

The coffee whitener of the present invention is non-dairy. By this is meant a product having no animal fat (i.e., its fat component is from vegetable origin) and no milk sugar. This product is therefore suitable for use by lactose-intolerant individuals.

The process of the present invention in its broadest embodiment comprises the following steps: (a) performing an ultra-high temperature sterilization treatment on a mixture comprising water, vegetable fat, an emulsifier system and a milk protein; (b) cooling the mixture; (c) homogenizing the mixture; and (d) further cooling and packaging the resulting homogenate in a container under aseptic conditions.

In the initial step of preparing the mixture, before adding any of the other components, the vegetable fat is heated to a temperature above its melting point, i.e., preferably above about 40.6° C. (105° F.). This is to facilitate the subsequent mixing of the vegetable oil with the other ingredients.

The water which is to be used in the emulsion mixture is preferably heated to a temperature of about 20° C. to 29° C. (70° F.–85° F.). To the heated water is added the stabilizer. The stabilizer is allowed to hydrate fully. After the stabilizer is fully hydrated, the water is heated to 43.3° C. (110° F.), with agitation. Sodium tripolyphosphate salt, when used, is added slowly. The salt is allowed to dissolve and the caseinate component is added. A solution of dipotassium phosphate salt, when used, is added next. A mixture of the melted fluid vegetable oil, containing the emulsifier system, is then added and mixed thoroughly. The flavoring, when used, is next added and the components are again mixed.

The mixture is next subjected to ultra-high temperature (UHT) treatment. Two different types of UHT processing are in common usage. These are commonly referred to in the industry as the indirect process and the direct process.

In the indirect sterilization process, the material is passed through a heat exchanger, generally a heat exchanger of the tubular or plate type. During this heat exchange process, the material is generally passed through a tubular coil that is maintained in a very hot environment, often through the use of superheated steam.

In the direct sterilization process, steam is injected directly into the material to heat it rapidly with maximum efficiency of heat exchange. For a description of one direct sterilization process and the equipment used, see U.S. Pat. No. 3,230,095, the disclosure of which is incorporated herein by reference. Since the injected steam condenses directly in the material, the condensation of the steam dilutes the material, generally with from 10% to 12% by weight of added water. This water may be removed, unless it is needed to achieve the desired water content. Removal of the water is generally accomplished by vacuum evaporation.

Preferably, the UHT treatment is by an indirect sterilization process. The UHT treatment occurs at an adequate temperature to provide commercial sterility, i.e., about 137° C. to about 149° C.

Preferably, before UHT treatment, the mixture is agitated well to assure a homogeneous mixture.

Following UHT treatment, the mixture is cooled and passed to a homogenization apparatus. The homogenization may be performed at about 43° C. to about 71° C., preferably at about 51° C. to about 68° C. Most preferably, homogenization is performed at about 57° C. to about 63° C.

Homogenization is preferably performed in two stages and about 1500 psi to 4000 psi total pressures, and preferably at about 2000 psi to about 3500 psi total pressures. The use of a two stage homogenization process to produce uniformity in the distribution of the fat particles results in an increase in the whitening power and the avoidance of a muddy appearance.

The resulting emulsion is then cooled to a temperature below about 28° C. and preferably below about 23° C. The product is then packaged in aseptic containers in accordance with any method known in the art. A preferred method for packaging aseptic dairy products is disclosed in U.S. patent application Ser. No. 807,450, filed Dec. 10, 1985, assigned to the assignee of the present invention, and incorporated herein by reference. The specification of this application discloses a process for the aseptic packaging of liquid dairy products wherein a selected gas, such as nitrogen, is injected into the liquid, and the resulting liquid-gas mixture is filled into a container and sealed under aseptic conditions. The fill volume of the liquid-gas mixture is such as to leave no free space in the container when it is closed. However, upon standing, separation of the liquid-gas mixture occurs, creating a nitrogen-filled headspace.

For optimal shelf-life, the aseptically packaged coffee whitener of this invention is first "aged" at a temperature below room temperature, e.g., at a temperature in the range from about 1° C. to about 12° C. Preferably, the product is aged at about 5° C. or below for a period of about 20 days to about three months, and preferably about two months. After this initial aging process, the non-dairy coffee whitener is shelf-stable at a temperature below about 30° C. for about nine months when unopened, and for up to four weeks when opened and refrigerated (i.e., at about 2° to 10° C.).

Though the present invention has been disclosed specifically as a coffee whitener, the product may be used for whitening tea or cocoa, or as a substitute for dairy cream in any cooking application, i.e., for use in "cream" sauces or in the preparation of "creamed" soups or other foods, for use with cereal, in cooking eggs, or in alcoholic beverages.

EXAMPLE 1

1561.9 pounds of water (87.8% by weight, based on the weight of the final composition) was metered into a 200 gallon tank and heated to 110° F. (43.3° C.). 15.1 pounds (0.85% by weight) of Alanate 180 sodium caseinate (from New Zealand Milk Products, Inc.) was added under agitation. 1.4 pounds (0.079%) of sodium tripolyphosphate and 404.1 grams (0.891 pound) (0.05% by weight) #205 Viscarin GP 109 carrageenan (available from FMC Corporation, Philadelphia, Pa.) were added slowly, and then a 50% solution comprising 8.0 pounds dipotassium phosphate (0.45% by weight) (available from Stauffer Chemical Company, Speciality and Food Products Division, Westport, Conn. 06881) was added.

186.9 pounds (10.5% by weight) of a vegetable oil having a melting point of 105° F. (40.6° C.), 3.0 pounds (0.17%) of Grinsted's Dimodan PV-K saturated distilled monoglyceride emulsifier, and 1.4 pounds (0.079%) of Grinsted's Panodan FDP-K diacetyl tartaric acid esters of monoglycerides were heated to above the melting point of the vegetable oil and emulsifiers and then mixed thoroughly with the other ingredients. 16.2 mL (0.0357 pound, or 0.002% by weight) Firmenich Artificial Cream Flavor 586.031/A was added and mixed.

The mixture was passed to a Stork UHT unit where it was agitated and then subjected to UHT treatment at 290° F. (143.3° C.) for 6.6 seconds and homogenized at a presterilization pressure of 2000 psi and a post sterilization pressure of 600 psi. The resulting emulsion was then cooled to a temperature below 25° C. and aseptically filled into sterile containers.

The packaged non-dairy creamer was then aged at 5° C. for 60 days and subsequently stored at 20° C. for nine months. It appeared to be commercially acceptable at the end of that time. In another test, the product maintained its desirable flavor and color properties for nine months when stored at 40° F. (4.4° C.).

COMPARATIVE EXAMPLE 1

The process of Example 1 was substantially repeated except that 115.7 pounds (6.5% by weight) of a maltodextrin, Maltrin M-100 having a DE of 10 (available from Grain Processing Corp. Muscatine, Iowa 52761) was included. The resulting non-dairy coffee whitener exhibited browning after nine days' time when stored at room temperature.

EXAMPLE 2

About 120 gallons of water (about 1,000 pounds of water) were heated to 110° F. About 0.65 pounds of sodium tripolyphosphate was added to the water to soften the water. An additional 0.65 pounds of the sodium tripolyphosphate (for a total of 0.08% by weight based on the total composition, or 1.3 pounds) of sodium tripolyphosphate was dry blended with 367 grams (0.05% by weight based on the total composition) of #205 Viscarin GP 109 carrageenan stabilizer.

The sodium tripolyphosphate was allowed to dissolve and then 13.7 pounds (0.85% by weight) of sodium caseinate was added slowly, one-half at a time. The mixture of the sodium tripolyphosphate and Viscarin stabilizer was added slowly. A 50% solution comprising 7.3 pounds (0.45% by weight) dipotassium phosphate available from Stauffer was added slowly. The remainder of the water (i.e., about 50 gallons, or 400 pounds) was then added and the mixture heated to 168° F. (75.6° C.).

169.6 pounds (10.50%) of vegetable oil having a melting point of 105° F., and an emulsifier system comprising 2.7 pounds of Dimodan PV-K (0.17% by weight) and 1.3 pounds (0.08% by weight) Panodan FDP-K were mixed into the blend. 14.7 mL or 0.002% by weight of Firmenich cream flavor was then added. The mixture was passed to a Stork UHT unit where it was sterilized at 290° F. (143.3° C.) for 6.6 seconds and homogenized at a presterilization pressure of 2000 psi and a post sterilization pressure of 600 psi. The resulting emulsion was then cooled to a temperature below 25° C. and aseptically filled into sterile containers.

The resulting creamer product, when added to a cup of coffee made from Maxwell House Instant Coffee, had a good, clean flavor and provided a good whiteness.

COMPARATIVE EXAMPLE 2

The process of Example 2 was substantially followed except that 104.9 pounds (6.50% based on the weight of the product) of Maltrin M-100 10 DE corn syrup solids (Grain Processing Corp.) was added before the addition of the dipotassium phosphate. The creamer product which resulted, when mixed with a cup of coffee made with Maxwell House Instant Coffee, had a starchy flavor and a dark color. Additionally, the product had an unfavorable darkening after nine days' storage at 4.4° C.

EXAMPLE 3

The process of Example 2 was substantially followed except that the amount of the Firmenich Artificial Cream Flavor was increased from 14.7 mL (0.002% by weight) to 56.775 mL (0.00775% by weight). The resulting creamer had what was deemed to be an unacceptable flavor.

COMPARATIVE EXAMPLES 3–8

The process of the above Example 2 was substantially followed except that the following ingredients were used in each of the Comparative Examples 3–8: 2 pounds, 10 ounces of a blend of vegetable oil; 96.4 grams of Alanate 180 sodium caseinate; 9.07 grams of sodium tripolyphosphate; 19.3 grams of Dimodan PV-K emulsifier; 9.1 grams of Panodan FDP-K emulsifier; 51.03 grams of dipotassium phosphate; and 0.23 mls of Firmenich Artificial Cream Flavor 586.031/A.

Additionally, Comparative Examples 3, 4 and 6 included 5.67 grams of Hercules CMJ-2 carrageenan; Examples 5, 7 and 8 included 5.67 grams of FMC Viscarin 402; Examples 3, 4 and 5 included 3 pounds, 3 ounces; 1 pound, 10 ounces; and 1 pound, 10 ounces, respectively, of Dri Sweet Corn Syrup (D.E. 24); and Example 8 included 1 pound, 10 ounces of Maltrin M-100 malto-dextrin (D.E. 10).

Finally, the compositions in Comparative Examples 3–8 contained the following amounts of water; 18 pounds, 12 ounces; 20 pounds, 6 ounces; 20 pounds, 6 ounces; 21 pounds, 15 ounces; 21 pounds, 15 ounces; and 20 pounds, 6 ounces, respectively.

Each of the resulting products had acceptable flavor and miscibility; the products including the CMJ-2 carrageenan had acceptable whitening properties; the products containing the Viscarin carrageenan product had excellent whitening properties.

Each of Examples 3–6, which contained 24 DE corn syrup, had unacceptable or borderline unacceptable coloration properties after nine days' storage at room temperature due to the Maillard reaction. Comparative Examples 7 and 8 had acceptable coloration at nine days' storage at room temperature, but unacceptable properties at 30 days' storage.

EXAMPLE 4

The process of Example 2 is substantially followed except that the resulting product is packaged in the following manner. Nitrogen gas is injected into the product so as to form many small bubbles that are uniformly distributed throughout the coffee whitener. The gas-whitener mixture is promptly filled into a package and sealed in the package under aseptic conditions. The gas and whitener separate, providing a headspace of about 14 cc. of evolved nitrogen gas. The whitener thus packaged has good flavor and excellent shelf-stability.

CONCLUSION

The present invention provides an aseptically packaged, liquid, shelf-stable non-dairy coffee whitener. Unlike prior art coffee whiteners, the product has an acceptable taste, mouth-feel, and consistency and is shelf-stable without refrigeration for long periods of time without undesirable browning which typically occurs in coffee whiteners that contain reducing sugars or aldoses, together with milk protein.

It has been found that, when ultra-high temperature sterilization treatment is performed in a non-dairy creamer which comprises both protein and reducing sugar, the Millard reaction takes place after a short period of time, i.e., as short as nine days after packaging. It has now been discovered that browning of aseptically packaged non-dairy coffee whiteners can be prevented by eliminating aldoses (high DE sugars) which have a dextrose equivalent of greater than 1 DE, to produce a liquid creamer which has a desirable shelf-life, flavor, and satisfactorily replaces real cream. The compositions of the present invention may be processed using selected techniques to prepare a shelf-stable aseptic product having the desired parameters.

While the invention has been disclosed in this patent application by reference to the details of the preferred embodiments of the invention, it is to be understood that this disclosure is intended in an illustrative rather than a limiting sense, as it is contemplated that modifications will readily occur to those skilled in the art, within the spirit of the invention and the scope of the appended claims.

What is claimed is:

1. An aseptically packaged, liquid non-dairy coffee whitener which is shelf-stable at room temperature for several months, comprising:
    about 75% to about 91% by weight of water;
    about 5% to about 15% by weight of vegetable fat;
    about 0.07% to about 0.30% by weight of an edible emulsifier system; and
    about 0.2% to about 2.6% of weight of a milk protein,
    said whitener being substantially free of reducing sugar.

2. The coffee whitener of claim 1 additionally comprising about 0.02% to about 0.11% by weight of a vegetable gum stabilizer.

3. The coffee whitener of claim 1 additionally comprising about 0.001% to about 0.1% by weight of a flavoring agent.

4. The coffee whitener of claim 1 additionally comprising about 0.07% by weight of a salt selected from the group consisting of dipotassium phosphate, sodium tripolyphosphate, and mixtures thereof.

5. The coffee whitener of claim 1 comprising about 0.75% to about 0.95% by weight of said milk protein.

6. The coffee whitener of claim 1 comprising about 0.1% to about 0.3% by weight of said system.

7. The coffee whitener of claim 2 comprising about 0.08% to about 0.12% by weight of said stabilizer.

8. The coffee whitener of claim 4 comprising about 0.45% to about 0.65% by weight of said salt.

9. The coffee whitener of claim 1 wherein said vegetable oil comprises partially or wholly hydrogenated vegetable oil selected from the group consisting of coconut oil, soybean oil, cottonseed oil, palm oil, palm kernel oil, peanut oil, or mixtures thereof.

10. The coffee whitener of claim 1 wherein said milk protein is selected from the group consisting of sodium caseinate, calcium caseinate, potassium caseinate, magnesium caseinate, mixed metal caseinates, acid casein, and mixtures thereof.

11. The coffee whitener of claim 10 wherein said milk protein is sodium caseinate.

12. The coffee whitener of claim 1 wherein said edible emulsifier system is selected from the group consisting of distilled monoglycerides, diacetyl tartaric acid esters of monoglycerides, sodium stearoyl-2-lactylate, lecithin, polysorbate 80, monoglycerides, diglycerides, and mixtures thereof.

13. The coffee whitener of claim 2 wherein said stabilizer is carrageenan.

14. A process for preparing an aseptically packaged, liquid non-dairy coffee whitener which is shelf-stable at room temperature for several months comprising the steps of:
  (a) performing an ultra-high temperature sterilization treatment on a mixture comprising water, vegetable fat, a vegetable gum stabilizer, an edible emulsifier system and milk protein;
  (b) cooling said mixture;
  (c) homogenizing said mixture to produce a homogeneous emulsion; and
  (d) further cooling and packaging said emulsion in a container under aseptic conditions.

15. The process of claim 14 wherein said milk protein is selected from the group consisting of sodium caseinate, calcium caseinate, potassium caseinate, magnesium caseinate, mixed metal caseinates, acid casein, and mixtures thereof.

16. The process of claim 14 wherein said edible emulsifier system is selected from the group consisting of distilled monoglycerides, diacetyl tartaric acid esters of monoglycerides, sodium stearoyl-2-lactylate, lecithin, polysorbate 80, monoglycerides, diglycerides, and mixtures thereof.

17. The system of claim 14 wherein said stabilizer is carrageenan.

18. The process of claim 14 wherein said ultra-high temperature treatment is performed at an adequate temperature to provide commercial sterility.

19. The process of claim 14 wherein said ultra-high temperature treatment is an indirect process.

20. The process of claim 14 wherein said sterilization treatment step is performed at a temperature of about 137° C. to about 149° C.

21. The process of claim 14 wherein said homogenizing step is of two stages performed at a total pressure of about 1500 psi to about 4000 psi.

22. The process of claim 14 wherein said homogenizing step is of two stages performed at a total pressure of about 2000 psi to about 3500 psi.

23. The process of claim 14 wherein said packaging step (d) a sterile gas is injected into said emulsion to form an emulsion-gas mixture and said mixture filled into a container and sealed under aseptic conditions such that, upon standing said mixture separates into a gas layer and an emulsion layer, said gas layer forming a headspace portion of said container.

24. The process of claim 23 wherein said sterile gas is nitrogen.

25. The process of claim 14 wherein the packaged emulsion is maintained at a cooled temperature of about 0° C. to about 10° C. for a period of about two months, subsequently stored at up to about 27° C.

26. A process for preparing an aseptically packaged, liquid non-dairy coffee whitener which is shelf-stable at room temperature for several months comprising the steps of:
  (a) performing an indirect process ultra-high temperature sterilization treatment on a mixture comprising about 75% to about 91% by weight of water; 0.07% to about 0.30% by weight of an edible emulsifier system; about 0.2% to about 2.6% by weight of a milk protein; and about 0.2% to about 0.11% by weight of a vegetable gum stabilizer;
  (b) cooling said mixture;
  (c) homogenizing said mixture at a total pressure of about 1500 psi to about 4000 psi to produce a homogeneous emulsion; and
  (d) further cooling and packaging said emulsion under nitrogen headspace under aseptic conditions.

27. An aseptically packaged, carbohydrate-free, liquid, non-dairy coffee whitener which is shelf-stable for several months prepared according to the process of claim 26.

* * * * *